United States Patent [19]

DeFigueiredo et al.

[11] Patent Number: 5,156,048

[45] Date of Patent: Oct. 20, 1992

[54] ELECTRONIC/MAGNETIC APPARATUS AND METHOD FOR DETECTING FLUID LEVEL

[75] Inventors: Carlos L. DeFigueiredo; George J. Doutney, both of Danbury, Conn.

[73] Assignee: Pitney Bowes Inc., Stamford, Conn.

[21] Appl. No.: 808,860

[22] Filed: Dec. 17, 1991

[51] Int. Cl.$^5$ .................... G01F 23/46; G01F 23/74
[52] U.S. Cl. ................... 73/308; 73/DIG. 5; 200/84 C; 222/DIG. 1
[58] Field of Search ............... 73/308, 313; 200/84 C; 222/DIG. 1; 33/DIG. 1

[56] References Cited

U.S. PATENT DOCUMENTS

| | | | |
|---|---|---|---|
| 3,976,963 | 8/1976 | Kubler | 200/84 C X |
| 4,361,835 | 11/1982 | Nagy | 73/313 X |
| 4,466,284 | 8/1984 | Dumery | 73/313 |
| 4,647,180 | 3/1987 | Watanabe | 222/DIG. 1 X |
| 4,843,193 | 6/1989 | Budecker et al. | 340/624 X |
| 4,976,146 | 12/1990 | Senghaas et al. | 73/308 X |
| 4,989,754 | 2/1991 | Grasso et al. | 222/DIG. 1 |

Primary Examiner—Daniel M. Yasich
Attorney, Agent, or Firm—Charles R. Malandra, Jr.; Melvin J. Scolnick

[57] ABSTRACT

A fluid level detector comprises a tank including a sleeve portion extending vertically from a bottom section of the tank to a top section of the tank, and sensor device mounted to a circuit board connected at one end to monitoring device, with the circuit board being inserted into the sleeve. There is a circular float assembly with a center aperture. The circular float assembly includes a pair of magnets mounted in push-pull orientation at opposite sides of the aperture within the float assembly. The float assembly is slidably positioned over the sleeve whereby the float assembly moves up and down the sleeve as the water level changes in the tank, wherein the sensor device generate a signal representing detection of fluid level by the sensor device when the fluid level in the tank is substantially at the level of the sensor device.

7 Claims, 2 Drawing Sheets

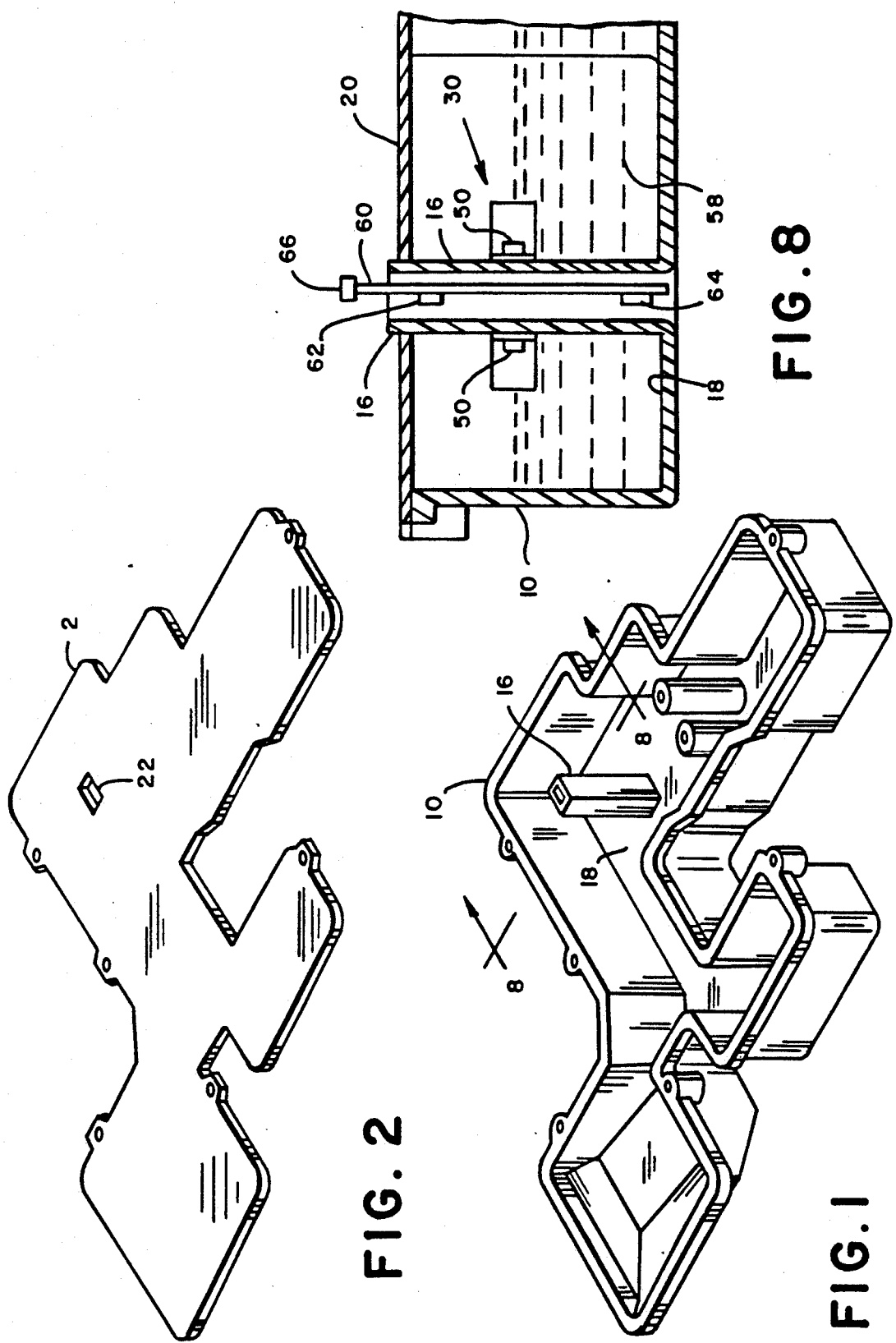

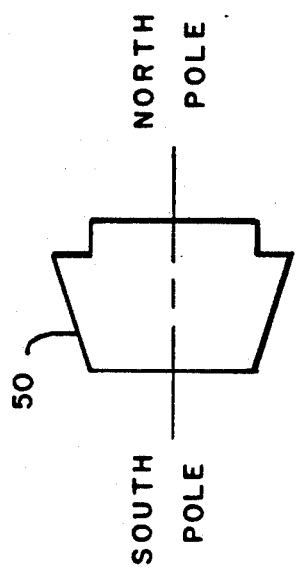
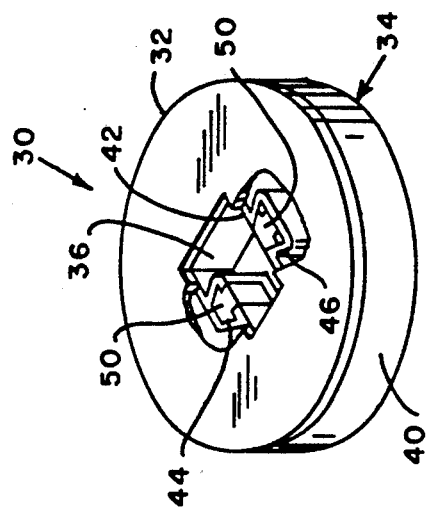
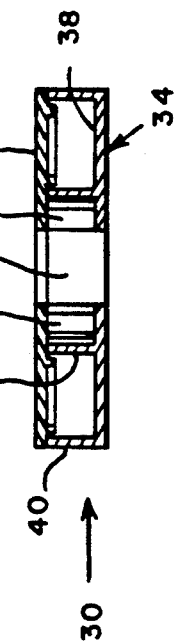
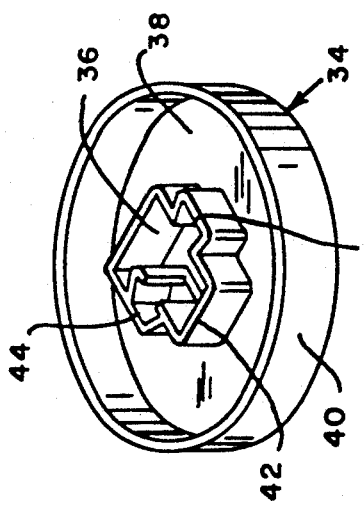
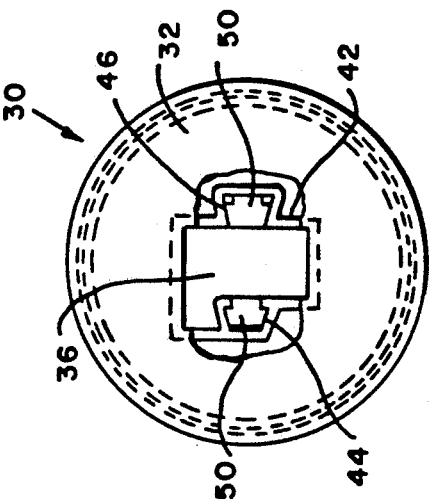

ELECTRONIC/MAGNETIC APPARATUS AND METHOD FOR DETECTING FLUID LEVEL

FIELD OF THE INVENTION

The invention disclosed herein relates to apparatus for automatically moistening envelope flaps and sealing envelopes, and particularly to a modular envelope moistener apparatus that moistens envelope flaps with water stored in a reservoir.

BACKGROUND OF THE INVENTION

The mailing process involves a number of operations including assembly and insertion of mail items, e.g., documents and inserts, into an envelope, moistening the envelope flap, sealing the envelope, weighing the envelope and applying postage. Automation of such operations, for example in an inserting machine, typically entails moving the mail items or envelopes through a plurality of stations, each station carrying out one of the operations of the process. With respect to envelope flap moistening and sealing operations, see for example, U.S. Pat. Nos. 1,194,568 (Storck), 2,749,689 (Colley), 4,233,931 (Gingerich et al.), 4,371,416 (Denzin), 4,428,794 (Hayskar et al.) and 4,450,037 (Gavronsky).

Typically, the moistening operation includes the introduction of water into an automatic envelope moistening apparatus that includes a reservoir, means in communication with the reservoir for applying moisture to the flap, and means for adding water to the reservoir. The fluid level in the reservoir must be maintained above a minimum level to ensure that a suitable amount of moisture is applied to the flap. In some cases, visual observation of the water in the reservoir may be possible if the reservoir tank is transparent or contains a transparent window which allows observation of the water level. In other cases, the reservoir is situated in the moistening apparatus such that observation is not possible. In general, even when the water level is observable, some form of fluid level detection is required to prevent the water level inadvertently falling below the minimum level.

A variety of fluid level detection methods are known. Those methods suitable for use in a moistening apparatus have encountered problems which are inherent in the particular method or are the result of improper maintenance. For example, one method detects water level by measuring the conductivity in the water. This method has had problems when there is a variance in the conductivity of the water. Such a variance can occur when an operator adds distilled water to the reservoir, causing a lower conductivity of the water in the reservoir. This results in the sensors failing to detect the fluid level accurately. In another scenario, distilled water is required for use in the reservoir because less maintenance is needed to keep the moistening apparatus operating properly. The sensors are calibrated for sensing the conductivity of the distilled water. The sensors fail to detect the fluid level accurately when the operator adds tap water to the reservoir.

Other level detection methods include optical sensor arrangements in which light beams pass through the reservoir and the fluid. One such method includes a float which interrupts the light beam from detection by the sensors. Such optical systems are susceptible to contamination of algae or scum or other material in the reservoir, thus requiring cleaning the reservoir at regular intervals to maintain the integrity of the fluid level detection.

Another level detection methods includes a float with an arm connected to a sensor outside the reservoir. Any such float and arm arrangement requires a high profile reservoir so that the arm has sufficient room to maneuver to ensure proper sensing of fluid level.

A fine resolution level detector is disclosed in U.S. Pat. No. 4,589,282 issued to Dumery on May 20, 1986. This detector includes a large number of equally spaced Hall sensors which are mounted in a tube to form a column of sensors. An annular float containing a compound magnet assembly is slidably fitted about the tube. The compound magnet assembly generates a pattern of regularly spaced apart magnetic field regions wherein the pattern of Hall sensor output voltage provides unique vernier measure of liquid level which is added to a rough measure obtained from the count of the Hall sensor closest to the float. It is clear that Dumery's detector is suitable for detecting fluid level when a fine resolution of fluid level is required. However, Dumery's detector is excessive for detecting only low and high levels in a reservoir.

In small moistening devices, such as in a table top inserting machine, there is a desire to have a reservoir that has a low profile but in which low or high fluid level can be reliably detected. Space requirements of such a low profile reservoir do not facilitate the use of the aforementioned methods of level detection.

SUMMARY OF THE INVENTION

It has been found that an electronic and magnetic system and method for detecting fluid level is suitable for use in a reservoir tank having a low profile. The present invention combines the use of one or more Hall effect sensors and a float containing two magnets in push-pull configuration to provide an accurate, but low cost system and method of level detection which are immune to contamination and which are suitable for almost any type of fluid level detection. The present invention requires low maintenance and is very reliable for detecting fluid level.

In accordance with the present invention, a fluid level detector comprises a tank including a sleeve portion extending vertically from a bottom section of the tank to a top section of the tank, and sensor means mounted to a circuit board connected at one end to monitoring means, with the circuit board being inserted into the sleeve. There is a circular float assembly with a center aperture. The circular float assembly includes a pair of magnets mounted in push-pull orientation at opposite sides of the aperture within the float assembly. The float assembly is slidably positioned over the sleeve whereby the float assembly moves up and down the sleeve as the water level changes in the tank, wherein the sensor means generate a signal representing detection of fluid level by the sensor means when the fluid level in the tank is substantially at the level of the sensor means.

BRIEF DESCRIPTION OF THE DRAWINGS

A complete understanding of the present invention maybe obtained from the following detailed description of the preferred embodiment thereof, when taken in conjunction with the accompanying drawings wherein like reference numerals designate similar elements in the various figures, and in which FIG. 1 is a perspective view of a water reservoir bottom;

FIG. 2 is a perspective view of the top to the water reservoir bottom of FIG. 1;

FIG. 3 is a perspective view of a float assembly of the present invention for use in the reservoir of FIG. 1;

FIG. 4 is a perspective view of the bottom section of the float assembly of FIG. 3;

FIG. 5 is a plan view of the float assembly of FIG. 3;

FIG. 6 is a plan view of a magnet used in the float assembly of FIG. 3;

FIG. 7 is a cross sectional view of the float assembly of FIG. 3;

FIG. 8 is a side elevational, cross sectional view taken along lines 8—8 of FIG. 1, with the float assembly of FIG. 3 mounted in the reservoir bottom of FIG. 1.

DETAILED DESCRIPTION OF THE PRESENT INVENTION

Referring now to the Figures, there is shown in FIG. 1 a bottom section of a tank or reservoir 10 for storing fluid, such as water. Reservoir 10 has a shallow but wide profile for being situated in limited space while holding a significant amount of water. There is a sleeve 16 which extends vertically from the lower surface 18 of bottom section 10 to a height slightly higher than the height of the side walls of bottom section 10 whereby sleeve 16 extends through top section 20 to seal the cavity within the sleeve 16 from water.

In FIG. 2, a top reservoir section 20 to bottom section 10 is shown. Top section 20 includes an aperture 22 that corresponds to the location and shape of sleeve 16 in bottom section 10.

Reservoir 10 is suitable for use in an envelope flap moistener and sealer section of an automatic mailing machine such as disclosed in U.S. patent application Ser. No. 636,533, filed on Dec. 11, 1990, and assigned to the assignee of the present invention, and incorporated herein by reference. Reservoir 10 is suitable for location below the deck on which the envelope is conveyed as it is moistened. The shallow and wide profile of the reservoir facilitates its use in a mailing machine having a small footprint. In the preferred embodiment of the present invention, the reservoir has a height of approximately 1 1/8 inches. It will be understood by those skilled in the art that the limited access space to the reservoir does not facilitate the use of the aforementioned types of fluid level detection.

Referring now to FIGS. 4 through 7, there is shown a float assembly generally designated 30. Float assembly 30 includes top and bottom sections 32 and 34 respectively each having an center aperture 36 corresponding to the shape of sleeve 16 in reservoir bottom 10. Float bottom 34 is a molded plastic shell with a lower circular shell section 38 and an elevated shell section 40 encircling shell section 38. Top section 32 is a flat piece of molded plastic. Float bottom 34 includes an inner shell section 42 corresponding to aperture 36 and having height identical to the height of shell section 40. Shell section 42 includes two compartments 44 and 46 that are situated on opposite sides of shell section 42 in which a pair of magnets 50 are inserted in a push-pull arrangement.

Referring now to FIG. 6, there is shown one of magnets 50 with north and south poles designated. The shape of each magnet 50 is such that the magnet can only be inserted one way into compartments 44 and 46. This ensures the proper polarity orientation between magnets 50 and sensors 62 and 64 during the assembling of float assembly 30. In the preferred embodiment of the present invention, magnets 50 are plastic moldable magnets having unique properties. The plastic magnets are a low cost magnet that can be molded, stamped or machined into a particular shape, are light in weight and have high magnetic strength. An example of such plastic magnets is Magnet Material B-1060 manufactured by 3M Electronics Products Division of St. Paul, Minn.

As best seen in FIG. 5, compartments 44 and 46 are shaped so that a pair of magnets 50 can be inserted in only one orientation. In compartment 44, one of the magnets 50 is inserted with the north pole facing aperture 36. In compartment 46, the other of the magnets 50 is inserted with the south pole facing aperture 36. This arrangement establishes a push-pull configuration between the magnets which orientates them north to south poles. This greatly increases the magnetic flux density and allows use of lighter duty magnets instead of one larger magnet to obtain the same flux density. It will be understood that there are some other method of using iron to shape the field strength.

Referring now to FIG. 8, there is shown a cross sectional view of float assembly 30 slidably mounted over sleeve 16 in reservoir 10 which has a level of fluid 58 therein. A printed circuit board 60 has been inserted into sleeve 16. Circuit board 60 sits within the cavity of sleeve 16 which protects circuit board 60 from the fluid 58 in reservoir 10. Circuit board 60 has mounted thereon upper and lower Hall sensing devices 62 and 64 respectively. Circuit board 60 has a connector 66 at its end extending out of sleeve 16 for applying power and receiving signals from sensing devices 62 and 64. In the preferred embodiment of the present invention, sensing devices 62 and 64 comprise two Hall effect switches, each of which is actuated by the presence of a magnetic field from magnets 50. Lower sensing device 64 senses low fluid level, and upper sensing device 62 senses high fluid level. It will be understood that more Hall switches could be used to provide intermediate fluid level detection. An example of the Hall switch used in the present invention is UGN 3040 Hall switch manufactured by Sprague Electric Company, Semiconductor Group of Concord, N.H.

It will be understood by those skilled in the art that the present invention can be used with just one sensor, e.g. only a low level sensor. With two sensors, i.e., high and low level detectors, the reservoir can be refilled on the fly without removal of the tank or visual observation of the fluid level. When the fluid level is between the two sensors the indication would show that the reservoir is less than full but not at a low level. An alternate embodiment includes a plurality of sensors, for example 6, which provides multi-level sensing capability.

The present invention provides an easy system for discriminating between different levels of water, e.g. 1/4 and 1/3 of an inch. This is particular significance for detecting low fluid level in reservoir 10. If reservoir 10 has a height of 1 1/2 inches, then a water level of 1/2 inch means that the reservoir is one third full. It may be desirable to have low level detection when the water level reaches 1/4 or 1/8 inch level. For other types of sensing systems, e.g., visual or optical systems, the resolution is such that the tank may be considered empty when level is down to 1/2 inch of fluid. In the preferred embodiment of the present invention at 1/2 inch of fluid is one third of the entire fluid supply. In the preferred embodiment of the present invention, low fluid level is detected at ⅛ inch. The low level Hall switch sensor is placed at ¼ inch above the bottom of circuit board 60.

The present invention is immune to contamination. It will sense any fluid as long as it is viscous within a certain range, generally as long as the fluid is pourable. It is suitable for almost any type of fluid level detection within certain temperature range, i.e., not too hot or too cold.

Float assembly bottom 34 and top 32 are ultrasonically welded together after magnets 50 are inserted. This arrangement provides a sealed cavity which causes the float assembly to float. Magnets 50 are exposed to the water in reservoir 10, however, plastic magnets are not effected in anyway.

The shape of aperture 36 allows mounting of float assembly top 32 in only one way to ensure the proper alignment of Hall sensors 62 and 64 top the push-pull arrangement of magnets 50. Hall sensors 62 and 64 detect signals from one direction. If the magnet orientation is opposite, sensors 62 and 64 will not detect its presence no matter how strong the magnetic signal. The south pole of magnet 50 must face the front side of Hall sensors 62 and 64. The side of sensors 62 and 64 away from circuit board 60 is front, so the south magnetic field of magnet 50 must face the front of Hall sensors 62 and 64. The shape of each magnet 50 matches the unique shape of each compartments 44 and 46 to ensure that the magnets are inserted in proper push-pull orientation. It will be understood by those skilled in the art that other magnetic materials could be used in place of the plastic magnets but are not easily molded to a particular shape to ensure proper orientation during assembling of the float assembly.

This present invention provides suitable resolution for low and high level detection with only two sensors because of the strength of the magnetic signal from the push-pull arrangement of the two magnets. The present invention provides an easy method to discriminate between different levels of water, e.g. ⅛ and ¼ of an inch. When one of Hall sensors 62 and 64 detect a threshold magnetic field strength, the respective sensor switches from off to on to provide a digital output signal representing high or low level detection. In the preferred embodiment of the present invention, Hall sensor 4 is placed approximately at the bottom of sleeve 16 because the magnetic field is strong enough to cause Hall sensor 64 to turn on when float assembly 30 is approximately ⅛ inch above Hall sensor 64.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. The method of detecting low fluid level in a tank comprising the steps of
   a) providing at least one Hall sensor mounted on a circuit board located in a vertical sleeve in the tank;
   b) providing a float assembly having first and second identically shaped compartments oriented in one direction at opposite sides of an aperture in said float assembly;
   c) inserting a pair of magnets, each of the magnets shaped for matching the shape of said first and second compartments such that said magnets are inserted only in one orientation with the north pole or one of said magnets facing said aperture and the south pole of the other of said magnets facing said aperture;
   d) fitting said aperture of said float assembly slidably over said sleeve; and
   e) monitoring a signal generated by said Hall sensor when fluid level in the tank causes said float assembly to be substantially next to said Hall sensor.

2. A fluid level detector apparatus, comprising:
   a tank including a sleeve member extending vertically from a bottom section of said tank to a top section of the tank;
   sensor means mounted to a circuit board connected at one end to monitoring means, said circuit board being inserted into said sleeve;
   a float assembly included first and second compartments containing a pair of magnets mounted in a push-pull configuration within said float assembly to increase magnetic flux density, said float assembly being slidably positioned over said sleeve member whereby said float assembly moves up and down said sleeve member as fluid level changes in said tank;
   wherein said sensor means generate a signal representing detection of the fluid level by said sensor means when the fluid level in the tank is substantially at the level of the sensor means, and wherein said magnets have a particular shape corresponding to a shape of said first and second compartments so that said magnets can be inserted into said compartments in only one orientation to ensure said push-pull configuration.

3. The apparatus according to claim 2 wherein said magnets are plastic molded types.

4. The apparatus according to claim 2 wherein said sleeve member has an asymmetrically shaped interior corresponding to a shape of said circuit board whereby said circuit board is insertable in only one orientation.

5. The apparatus according to claim 4 wherein said sleeve member has an asymmetrically shaped exterior whereby said float assembly can be positioned over said sleeve member is only one orientation.

6. The apparatus according to claim 2 wherein said sensor means comprises at least one Hall switch located near the bottom of said tank for detecting at least low fluid level in said tank, said Hall switch being oriented on said circuit board to detect a signal from said magnets.

7. The apparatus according to claim 6 wherein a second of said Hall switches is located at the top of said tank for detecting a full tank when said tank is being refilled.

* * * * *